COLOR TELEVISION IMAGE REPRODUCTION
Filed March 21, 1951
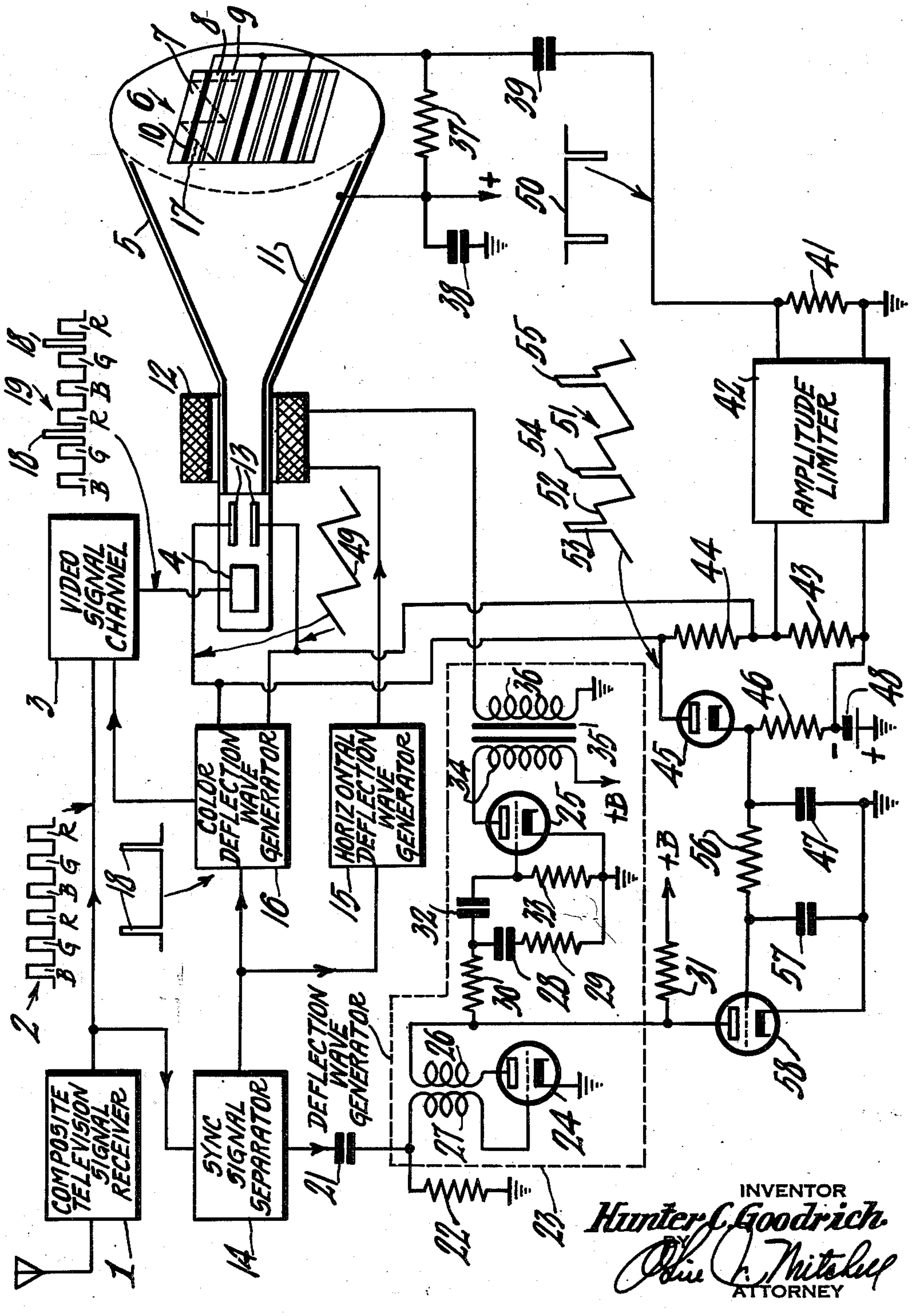
INVENTOR
Hunter C. Goodrich
BY
ATTORNEY Patented Apr. 7, 1953 2,634,326

UNITED STATES PATENT OFFICE 2,634,326

COLOR TELEVISION IMAGE REPRODUCTION

Hunter C. Goodrich, Collingswood, N. J., assignor to Radio Corporation of America, a corporation of Delaware Application March 21, 1951, Serial No. 216,766

5 Claims. (Cl. 178—5.4)

This invention relates to television image reproducing systems and particularly, but not necessarily exclusively, to apparatus for controlling an electron beam so as to excite the luminescent screen of a kinescope in a manner to reproduce television images substantially in their natural colors.

The invention is related in general to systems of the type employing a multicolor kinescope such as that disclosed in U. S. Patent 2,310,863, granted February 2, 1943 to H. W. Leverenz and entitled "Luminescent Screen." The screen of such a tube consists of discrete phosphor strips of a subelemental width and capable respectively of emitting differently colored light when excited by an electron beam. The phosphor strips extend generally in a horizontal direction and the electron beam is deflected over the screen generally in a conventional manner. The different phosphor strips of each of the groups are selectively excited to produce the desired color concurrently with the reception of signals representing these colors by imparting to the beam an additional vertical deflection as it scans the successive groups of strips horizontally. In order to successively operate a tube of the connection described, it is necessary that the vertical deflection of the beam be effected with a high degree of linearity.

Accordingly, it is an object of the present invention to provide an improved color television reproducing system in which an electron beam is maintained in substantially exact registration with a line phosphor screen.

Another object of the invention is to provide an electron beam controlling system in which signals generated in response to the beam deflection over a line phosphor screen are employed to maintain a desired registration of the beam with the screen.

In accordance with the invention, the image reproducing kinescope is provided with a line phosphor screen, the elements of which are capable of producing light of different colors when excited by an electron beam. The screen is also provided with signal generating facilities responsive to excitation by the beam and indicative of the registration of the beam with the screen. One of the features of the invention is in vertically deflecting the beam as it scans the screen horizontally so as to successively and repeatedly traverse each of the phosphor strips comprising the group being scanned. The auxiliary vertical deflection of the beam may be effected according to any predetermined pattern such as represented by a sine wave or a sawtooth wave, for example.

According to the invention, the signals generated by the excitation of the screen by the electron beam are combined with a wave corresponding to the auxiliary deflection of the beam to produce signals that may be used to control the vertical deflection wave generator, by means of which the beam is influenced to scan a conventional raster, so as to effect the desired registration of the beam with the screen.

The novel features that are considered characteristic of this invention are set forth with particularity in the appended claims. The invention itself, however, both as to its organization and method of operation as well as additional objects and advantages thereof will best be understood from the following description taken in connection with the accompanying drawing.

The single figure of the accompanying drawing is a combination block diagram and schematic circuit diagram of an illustrative form of a television reproducing system embodying the present invention.

Reference now will be made to the drawing for a more detailed description of this embodiment of the invention. The system includes a composite television signal receiver 1 which may be entirely conventional. It will be understood that this apparatus may include one or more stages of radio frequency signal amplification, a first detector or frequency converter, one or more stages of intermediate frequency signal amplification and a second or signal detector. Accordingly, it will be understood that there is derived from the output circuits of the receiver demodulated video and synchronizing signal intelligence.

The video signals derived from the receiver 1 may be in any one of a number of different forms depending upon the mode of operation to be employed in operating the image reproducing kinescope. This feature of the system forms no part of the present invention and, accordingly, there is not shown in detail the specific means used for deriving the video signals in any particular form. It will be assumed, however, that the present invention is embodied in a color television system operating according to the dot or elemental multiplex principle. Such a system is described in greater detail in an article titled "A six-megacycle compatible high-definition color television system" published by RCA Laboratories Division in the RCA Review, December 1949—vol. X, No. 4, p. 504. A representative system of this character also is described in a copending U. S. application of John Evans, Serial No. 111,384 filed August 20, 1949 and titled "Color Television." In accordance with a system of the type described in the publication and in the Evans application referred to, the video signals are in the form of time-spaced pulses representative respectively of the different color components of successive elemental areas of the image to be reproduced. Accordingly, it will be understood that the pulses indicated at 2 represent for example the blue, green and red color components of successive elemental areas of the image to be reproduced. These impulses are amplified in a video signal channel 3 and thence they are impressed upon the intensity control electrode system of an electron gun 4 forming part of a multicolor kinescope 5.

The kinescope also is provided with a luminescent screen 6 formed of a multiplicity of horizontal phosphor strips such as the red, green and blue light-producing strips 7, 8 and 9, respectively. In accordance with the present invention, the screen 6 also includes a plurality of conducting strips such as 10 which may be imbedded between, but electrically insulated from, predetermined ones of the phosphor strips. In the present case, it is assumed that the conductors 10 are placed between the red and green phosphor strips of each of the multiplicity of phosphor strip groups. The conductors 10 are electrically connected together to form a grid which is connected to an external circuit to be described more in detail subsequently.

A second anode in the form of a metallic wall coating 11 is another conventional kinescope electrode which, as customary, is connected to a source of relatively high positive potential. The kinescope 4 also is provided with a conventional deflection yoke 12 which may be energized in the usual manner to deflect the electron beam both horizontally and vertically in accordance with a predetermined pattern to scan a raster at the screen 6. Additionally, the kinescope is provided with an auxiliary deflection system which, in the present instance, is illustrated as a pair of plates 13. These electrodes are energized in a manner to be described to cause the electron beam to be deflected vertically with a relatively high frequency while it is being deflected horizontally to scan successive lines of the desired raster.

The synchronizing signal intelligence derived from the composite television signal receiver 1 is segregated from the video signals by means of a synchronizing signal separator 14 coupled to the output of the receiver. This apparatus also may be entirely conventional. Accordingly, it will be understood that there is derived from the synchronizing signal separator both the horizontal and vertical synchronizing pulses. The horizontal synchronizing pulses are impressed upon a conventional horizontal deflection wave generator 15. The output of this generator is connected to the deflection yoke 12 as indicated to energize it by a substantially sawtooth wave at line frequency in the usual manner.

Suitable color synchronizing pulses are impressed upon a color deflection wave generator 16 so as to synchronize its operation. This generator also may be of the type capable of producing a substantially sawtooth wave at the color repetition frequency and at a fixed phase relationship to the color component of the video signal. In the assumed case of a system operating in accordance with the dot multiplex principle, the frequency of the wave produced by the generator 16 will be of the order of 3.6 mc. per second. The output circuit of this generator in which the sawtooth wave is produced is coupled to the auxiliary deflection plates 13. In this manner the electron beam is given an auxiliary sawtooth deflection of relatively small amplitude so that, as it is being deflected by the yoke 12 to scan successive horizontal lines in the usual manner, it traces a substantially sawtooth path as indicated at 17. It is seen that the trace 17 extends only over one group of phosphor strips.

Further details of the synchronization of the color deflection wave generator 16 may be found in two publications by Radio Corporation of America titled "Synchronization for Color Dot Interlace in the RCA Color Television System," October 1949 and "Recent Developments in Color Synchronization in the RCA Color Television System," February 1950. These color synchronizing systems form the subject matter of copending U. S. patent applications of Randall C. Ballard, Serial No. 117,528 filed September 24, 1949 and titled "Systems of Color Television" and of Alda V. Bedford, Serial No. 143,800, filed February 11, 1950 and titled "Synchronizing Apparatus."

There also is derived from the color deflection wave generator 16 a series of pulses such as indicated at 18. These pulses occur at the color repetition rate and are of a fixed predetermined amplitude. Preferably this amplitude should be greater than the greatest possible amplitude of the video signal pulses 2. The pulses 18 are impressed upon the video signal channel 3 for mixing with the video signal pulses 2 in such a manner that they may be employed as position reference signals. The phase of the pulses 18 should be adjusted relative to the video signal pulses 2 so that, when mixed together, there is produced in the output circuit video channel 3 a train of pulses such as indicated at 19. It is seen that the position reference pulses 18 are mixed with the video signal pulses in such a way that they occur successively between the green and red representative video signal pulses. By means of the position reference pulses, the intensity of the electron beam is controlled independently of the video signal for a purpose to be described in conjunction with the utilization of the signals produced by the conductor grid of the kinescope screen.

The vertical synchronizing signals derived from the synchronizing signal separator 14 are impressed by a coupling including a capacitor 21 and a resistor 22 upon a vertical deflection wave generator 23 for the purpose of synchronizing it. This generator also may be entirely conventional. The essential components of it are illustrated in detail in order to illustrate the manner in which the present invention functions in conjunction with it. The vertical deflection wave generator includes a combined oscillator and discharge tube 24 and an output tube 25. Both of these tubes have been illustrated as triodes for the purpose of simplicity. It will be understood that other types of tubes may be used alternatively without departing from the present invention. In order that the tube 24 may function as a blocking type oscillator, feedback may be provided by inductively coupled anode and grid coils 26 and 27, respectively. The output circuit of the tube 24 also includes a capacitor 28 and resistors 29 and 30 connected in series therewith between the anode circuit of the tube 24 and ground. The anode circuit of this tube also is connected through a resistor 31 to a source of energy of positive polarity.

The tube 24 normally is non-conducting so that the capacitor 28 charges at a relatively slow rate through resistors 29, 30 and 31. When the tube 24 is rendered conducting under the control of one of the vertical synchronizing signals impressed upon the grid, the condenser 28 is discharged at a relatively rapid rate through the tube 24. Accordingly, at the high potential terminal of the capacitor 28, there is developed a substantially sawtooth wave as a result of the described operation.

The high potential terminal of the capacitor 28 is coupled by a capacitor 32 and a leak resistor 33 to the control grid of the output tube 25. The anode of this tube is connected through the primary winding 34 of an output transformer 35 to an energy source of positive polarity. The secondary winding 36 of this transformer is connected to the deflection yoke 12 so as to provide it with a substantially sawtooth wave at the field deflection frequency.

The vertical deflection generator in actual practice may include other features such as potentiometers for controlling linearity and the vertical height of the raster scanned. However, since none of these features have any connection with the present invention they have not been specifically illustrated.

The vertical sawtooth deflection wave derived from the generator 23 is made subject to control in amplitude by means of apparatus in accordance with a feature of the present invention. The grid formed by the conductors 10 of the screen 6 is connected to an output resistor 37 externally of the kinescope 5. The output resistor also is connected, as indicated, to the source of potential for the second anode 11 in order to minimize the potential difference between the grid conductors and the phosphor screen. The output resistor 37 also is bypassed to ground by a capacitor 38. The grid-connected terminal of the resistor 37, in the present form of the invention, is coupled by a capacitor 39 to an input resistor 41 for an amplitude limiter 42. The limiter may be conventional in form comprising, for example, an electron amplifier tube biased so as to be driven to saturation by the signals developed in the resistor 41.

The output circuit of the limiter 42 is connected to a resistor 43 forming part of a signal combining circuit. Another resistor 44 connected in series with the resistor 43 forms another component of the signal combining circuit and has its terminals connected to the sawtooth wave output terminals of the color deflection wave generator 16. The two resistors 43 and 44 are further connected to a series arrangement of a diode 45, a diode load circuit, including a resistor 46 and a shunting capacitor 47, and a source of biasing voltage represented by the battery 48.

The sawtooth wave 49 developed by the generator 16 at the color repetition frequency is impressed upon the deflection plates 13 to cause the beam to be deflected vertically along the trace 17 in the manner described. In addition, the sawtooth wave 49 also is impressed upon the signal combining resistor 44. Position indicating signals such as represented at 50 are derived, in negative polarity, from the grid of conductors 10 in response to each traversal of the electron beam over one of the conductors during the relatively slow portions of the sawtooth trace 17. These pulses, after being reversed in polarity and limited in amplitude to a predetermined common level by the limiter 42, are developed across the signal combining resistor 43 in such a way that they are impressed upon the diode 45 in conjunction with the sawtooth wave 49.

There is impressed upon the diode 45, therefore, a composite wave having substantially the form shown at 51. It is seen that the composite wave consists of successive cycles of a substantially sawtooth wave 52. Superimposed on each one of these sawtooth waves is a pulse such as 53 coresponding to one of the pulses 50. It is seen that, depending upon the time of occurrence of the pulses 50 relative to the sawtooth wave 49, the superimposed pulses such as 53 have different peak amplitudes relative to a point of reference. The peak amplitudes of the pulses such as 53 is an indication of the registration of the electron beam with the luminescent screen 6.

For example, if it be assumed that the pulse 53 represents the desired registration of the beam at the screen, a vertical deflection of the beam at field frequency which causes the horizontal sweep of the beam to move upward relative to the group of phosphor strips effects the traversal of one of the conductive strips 10 at a time earlier than normal. Accordingly, such a signal pulse derived from the grid of conductors 10 would be represented at 54 when superimposed upon the sawtooth wave 52. Since the pulse 54 occurs earlier than it should, it is placed upon a lower amplitude portion of the sawtooth wave and, therefore, has a smaller peak amplitude than a normal pulse 53, for example. Similarly, a downward deflection of the beam relative to the groups of phosphor strips on the luminescent screen 6 causes the pulse developed by the network of conductors 10 to occur later than it should. Such a pulse is represented at 55 with reference to the sawtooth wave 52. It is seen that its peak amplitude is greater than that of the normal pulse 53.

Diode 45 functions as a peak rectifier, because the time constant of the diode load circuit, including resistor 46 and capacitor 47, is long compared with the period of the composite waveform 51 impressed upon the anode. Accordingly, there is developed in the diode load circuit a unidirectional voltage which is approximately equal to the peak voltage, such as represented by the pulses 53, 54 and 55, impressed upon the anode of the diode 45.

The unidirectional voltage which is developed in the manner described, therefore, is representative of the sense and magnitude of the deviation of the vertical deflection of the electron beam from substantially exact registration with the groups of phosphor strips comprising the screen 6. The diode output voltage is further filtered by means of a filter comprising a series resistor 56 and a shunt capacitor 57. The filter is connected between the diode output circuit and the control grid of an electron tube 58 serving to regulate the magnitude of the vertical deflection wave produced by the generator 23. Proper bias for tube 58 is provided by bias source 48.

Space current for the tube 58 is derived by a connection of the anode to the resistor 31. It is seen that the voltage developed at the anode of the tube 58 is controlled by the magnitude of the space current conduction in this tube. This, in turn, is responsive to the registration signals such as represented by the pulses 53, 54 and 55 in the manner described. The voltage developed at the anode of the tube 58 is that which is impressed upon the capacitor 28 for charging it as described. A variation of the voltage correspondingly varies the charging rate of this capacitor whereby to control the vertical deflection of the electron beam in the manner desired.

Thus, a decrease in the anode voltage of the tube 58 in response to an increase in the current conduction therein effects a decrease in the rate at which the capacitor 28 is charged. Accordingly, the sawtooth wave derived from the generator 23 will be altered suitably so that the electron beam will be deflected vertically at a slower rate. Similarly, an increase in the vertical deflection of the electron beam is effected by increasing the rate at which the capacitor 28 is charged by means of an increase in the anode voltage of the tube 58 in response to a decrease in the current conduction therein.

It may be found in some cases that it is unnecessary to provide the conductors 10 in such form that they extend horizontally throughout the entire raster area of the screen 6. It is considered to be within the scope of the present invention to provide a structure in which the conductors 10 are of a somewhat shorter nature. It may be found that it is not necessary to extend the conductors into the picture area at all. In such a case, the relatively short conductors would be confined to one of the marginal regions so that they may be traversed by the scanning beam slightly in advance of the scansion of the screen for image reproduction. In such a case, the beam may be modulated in a desired manner prior to the modulation thereof by the video signals representing the different color components of the image to be reproduced. The position of the scanning beam relative to any group of phosphor strips then would be indicated prior to the start of the scansion of this group of strips. In such a case, the vertical deflection wave generator must be sufficiently stable in operation to maintain good linearity for the duration of each horizontal line scansion.

In cases where it is found to be unnecessary to extend the conductors 10 throughout the entire length of each group of phosphor strips, it will not be necessary to include the position reference pulses such as 18 with the video signal pulses as described in connection with the illustrative embodiment of the invention shown herein. Furthermore, it may be determined, in some cases where the conductors 10 do extend the entire width of the screen, that the special position reference pulses 18 are not needed for the successful operation of the system.

It should be noted also that the phosphor strips such as 7, 8 and 9 of the kinescope screen 6 preferably are formed on the target electrode of the kinescope 5 in such a way that they are separated slightly from one another. Such an arrangement will minimize an undesired mixing of the colors which might otherwise be produced.

Also, it will be apparent that the diode 45, in conjunction with its associated circuit components, functions essentially as a phase comparator in detecting any phase differences between the color deflection wave and the grid-generated position indicating pulses. Accordingly, it will be understood that equivalent types of phase comparators may be used instead of that disclosed without departing from this invention.

It may be seen from a consideration of the foregoing description of an illustrative embodiment of the invention that there is provided an improved color television image reproducing system. The color selection is achieved in a particularly advantageous manner by the comparatively simple expedient of giving the electron beam a small amplitude, auxiliary vertical deflection while it is being deflected conventionally both horizontally and vertically so that it successively and repeatedly traverses different phosphor strips of a group capable respectively of producing light of the different component image colors in response to and concurrently with the reception of video signals representative of these component image colors. Furthermore the invention provides a relatively simple and efficient means for maintaining the necessary registration of the electron beam with successive groups of a multiplicity of groups of horizontal phosphor strips.

The nature of the present invention is substantially as described in the foregoing specification. Its scope is set forth in the following claims.

What is claimed is:

1. In a color television system, a multi-color kinescope having a luminescent screen including a multiplicity of groups of phosphor strips capable respectively of producing light of a plurality of component image colors in response to excitation by an electron beam, said screen also having conductors aligned respectively with said groups of phosphor strips and connected together electrically to form a grid, means for developing an electron beam and deflecting it to scan a raster at said screen, means including a periodic wave generator for effecting an auxiliary deflection of said beam in a predetermined cyclically recurring pattern in a direction transverse to the direction of said phosphor strips, whereby successively and repeatedly to traverse said phosphor strips, thereby producing differently colored image-representative light and also to traverse said grid conductors, thereby developing position-indicating pulses, means for combining said position-indicating pulses with said periodic auxiliary deflection wave to develop a control signal representative of any misregistration of said beam with said screen, and means responsive to said control signal and coupled to said beam-deflecting means to correct the deflection of said beam in the direction transverse to the direction of said phosphor strips.

2. In a color television system, apparatus as defined in claim 1 wherein, said combining means includes a circuit upon which are concurrently impressed said periodic auxiliary deflection wave and said position-indicating pulses whereby said pulses are superimposed upon said wave to form said developed control signal, and means for converting the peak amplitudes of said control signal into a unidirectional control voltage for impression upon said beam-deflecting means.

3. In a color television system, apparatus as defined in claim 2 wherein, said converting means includes a diode biased so as to be rendered conducting only in response to said peak amplitudes whereby to develop a series of time-spaced pulses, and a filter coupled to the output circuit of said diode to produce said unidirectional control voltage from said series of pulses.

4. In a color television system, apparatus as defined in claim 3 wherein, said beam-deflecting correcting means includes an electron tube responsive to said unidirectional control voltage to variably control the rate of said beam deflection in said transverse direction.

5. In an image reproducing system, a cathode ray tube having a luminescent screen, a plurality of spaced conducting strips extending horizontally across said screen and connected together to form a grid, means for developing an electron beam and deflecting it horizontally and vertically to scan a raster at said screen, means for effecting an auxiliary sawtooth vertical deflection of said beam whereby to repeatedly traverse each of said strips and consequently develop pulses indicative of the linearity of said vertical beam deflection, means responsive to said developed pulses for generating control signals having amplitudes varying in accordance with the time in said auxiliary sawtooth beam deflection cycles at which said pulses are developed, and means responsive to said control signals to maintain the linearity of said vertical beam deflection sufficiently accurate to cause said beam to scan said screen in substantially precise horizontal lines.

HUNTER C. GOODRICH.

REFERENCES CITED

The following references are of record in the file of this patent:

UNITED STATES PATENTS

| Number | Name | Date |
|---|---|---|
| 2,415,059 | Zworykin | Jan. 28, 1947 |
| 2,490,812 | Huffman | Dec. 13, 1949 |
| 2,530,431 | Huffman | Nov. 21, 1950 |
| 2,545,325 | Weimer | Mar. 13, 1951 |